United States Patent
Gunaratne

(10) Patent No.: US 8,369,608 B2
(45) Date of Patent: Feb. 5, 2013

(54) SYSTEM AND METHOD FOR DETECTING DROWSY FACIAL EXPRESSIONS OF VEHICLE DRIVERS UNDER CHANGING ILLUMINATION CONDITIONS

(75) Inventor: Pujitha Gunaratne, Windsor (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 670 days.

(21) Appl. No.: 12/488,834

(22) Filed: Jun. 22, 2009

(65) Prior Publication Data

US 2010/0322507 A1 Dec. 23, 2010

(51) Int. Cl.
*G06K 9/00* (2006.01)

(52) U.S. Cl. ......... 382/154; 382/118; 382/224; 382/275

(58) Field of Classification Search .......... 382/118, 382/154, 209, 224, 275
See application file for complete search history.

(56) References Cited

U.S. PATENT DOCUMENTS

| | | | |
|---|---|---|---|
| 5,795,306 A | 8/1998 | Shimotani et al. | |
| 5,859,921 A | 1/1999 | Suzuki | |
| 6,049,747 A | 4/2000 | Nakajima et al. | |
| 6,496,117 B2 | 12/2002 | Gutta et al. | |
| 6,560,366 B1 * | 5/2003 | Wilkins | 382/236 |
| 6,724,920 B1 | 4/2004 | Berenz et al. | |
| 6,847,873 B1 | 1/2005 | Li | |
| 6,925,425 B2 | 8/2005 | Remboski | |
| 6,927,694 B1 | 8/2005 | Smith et al. | |
| 6,974,414 B2 | 12/2005 | Victor | |
| 6,982,635 B2 | 1/2006 | Obradovich | |
| 7,027,621 B1 | 4/2006 | Prokoski | |
| 7,071,831 B2 | 7/2006 | Johns | |
| 7,079,674 B2 * | 7/2006 | Paragios et al. | 382/128 |
| 7,149,653 B2 | 12/2006 | Bihler et al. | |
| 7,292,152 B2 | 11/2007 | Torkkola et al. | |
| 7,336,804 B2 | 2/2008 | Steffin | |
| 7,389,178 B2 | 6/2008 | Raz et al. | |
| 7,391,305 B2 | 6/2008 | Knoll et al. | |
| 7,423,540 B2 | 9/2008 | Kisacanin | |
| 7,482,911 B2 | 1/2009 | Lengning et al. | |
| 7,561,054 B2 | 7/2009 | Raz et al. | |
| 2004/0071318 A1 | 4/2004 | Cheung et al. | |

(Continued)

FOREIGN PATENT DOCUMENTS

JP 8083344 3/1996

OTHER PUBLICATIONS

Kim, Kyungnam, "Face Recognition using Principle Component Analysis", Dept. of Computer Science, University of Maryland, 7 pages.

*Primary Examiner* — John Strege
(74) *Attorney, Agent, or Firm* — Snell & Wilmer, LLP

(57) ABSTRACT

The present invention includes a method of detecting drowsy facial expressions of vehicle drivers under changing illumination conditions. The method includes capturing an image of a person's face using an image sensor, detecting a face region of the image using a pattern classification algorithm, and performing, using an active appearance model algorithm, local pattern matching to identify a plurality of landmark points on the face region of the image. The method also includes generating a 3D face model with facial muscles of the face region, determining photometric flows from the 3D face model using an extract photometric flow module, determining geometric flows from the 3D face model using a compute geometric flow module, determining a noise component generated by varying illuminations by comparing the geometric flows to the photometric flows, and removing the noise component by subtracting two photometric flows.

20 Claims, 3 Drawing Sheets

U.S. PATENT DOCUMENTS

| | | |
|---|---|---|
| 2005/0024212 A1 | 2/2005 | Hultzsch |
| 2005/0030184 A1 | 2/2005 | Victor |
| 2006/0072792 A1 | 4/2006 | Toda et al. |
| 2006/0095175 A1 | 5/2006 | deWaal et al. |
| 2007/0127787 A1* | 6/2007 | Castleman et al. ........... 382/118 |
| 2007/0165910 A1 | 7/2007 | Nagaoka et al. |
| 2008/0069403 A1 | 3/2008 | Breed |
| 2008/0212828 A1* | 9/2008 | Ishida et al. .................. 382/100 |
| 2008/0303915 A1 | 12/2008 | Omi |
| 2009/0129638 A1* | 5/2009 | Kim .............................. 382/118 |

* cited by examiner

SYSTEM AND METHOD FOR DETECTING DROWSY FACIAL EXPRESSIONS OF VEHICLE DRIVERS UNDER CHANGING ILLUMINATION CONDITIONS

BACKGROUND

1. Field

The invention relates to systems and methods for detecting facial expressions of vehicle drivers. More particularly, the invention relates to systems and methods for detecting drowsy facial expressions of vehicle drivers under changing illumination conditions.

2. Background

During operation of a vehicle, many drivers experience drowsiness which causes their eyes to shut for brief and sometimes even prolonged periods of time. Hence, being able to detect the drowsiness of an operator of a vehicle is becoming more and more important from a safety point of view.

In the past, a number of physiological sensors, such as respiratory, pulse, blood pressure, and driver movement sensors, have been used to detect drowsiness of drivers. These physiological sensors, however, have several drawbacks. For example, the reliability of these sensors is generally low and the attachment of these sensors is time-consuming and generally beyond the skill and interest of the driver. To alleviate these drawbacks, noninvasive sensors that do not require any set-up procedures to be performed by the driver have been developed.

Noninvasive video monitoring systems and methods monitor the face of an operator of a vehicle, such as a driver of a truck, to determine whether the operator may be falling asleep while operating the vehicle. As an example, digital imaging systems have been developed to continuously monitor a vertical eye width and determine a drowsiness factor based on the vertical eye width. These digital imaging systems require precise positioning of the eye to obtain 10 points of interest within the palpebral fissure (i.e., separation between the lower and upper eye lids). Under normal driving conditions, obtaining the precise positioning of the eye may not be feasible. Furthermore, variations in light intensity, eyeglass reflections, and normal driving facial movements make determination of the points of interest within the palpebral fissure likely to be unreliable.

Therefore, a need exists in the art for systems and methods for detecting drowsy facial expressions of vehicle drivers under changing illumination conditions.

SUMMARY

The present invention includes a method of detecting drowsy facial expressions of vehicle drivers under changing illumination conditions. The method includes capturing an image of a person's face using an image sensor, detecting a face region of the image using a pattern classification algorithm, and performing, using an active appearance model algorithm, local pattern matching to identify a plurality of landmark points on the face region of the image. The method also includes generating a 3D face model with facial muscles of the face region, determining photometric flows from the 3D face model using an extract photometric flow module, determining geometric flows from the 3D face model using a compute geometric flow module, determining a noise component generated by varying illuminations by comparing the geometric flows to the photometric flows, and removing the noise component by subtracting two photometric flows.

The present invention includes a method of detecting facial expressions of a person under changing illumination conditions. The method includes capturing an image of a person's face using an image sensor, detecting a face region of the image using a pattern classification algorithm, performing, using an active appearance model algorithm, local pattern matching to identify a plurality of landmark points on the face region of the image, generating a 3D face model with facial muscles of the face region, categorizing the facial muscles into action units, determining photometric flows from the 3D face model using an extract photometric flow module, determining geometric flows from the 3D face model using a compute geometric flow module, comparing the geometric flows with stored geometric flows for a match, retrieving the stored geometric flows that match the geometric flows, and determining whether a facial deformation of the face region exists using the retrieved geometric flows.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Apparatus, systems and methods that implement the embodiments of the various features of the invention will now be described with reference to the drawings. The drawings and the associated descriptions are provided to illustrate some embodiments of the invention and not to limit the scope of the invention. Throughout the drawings, reference numbers are re-used to indicate correspondence between referenced elements.

Figure 1:
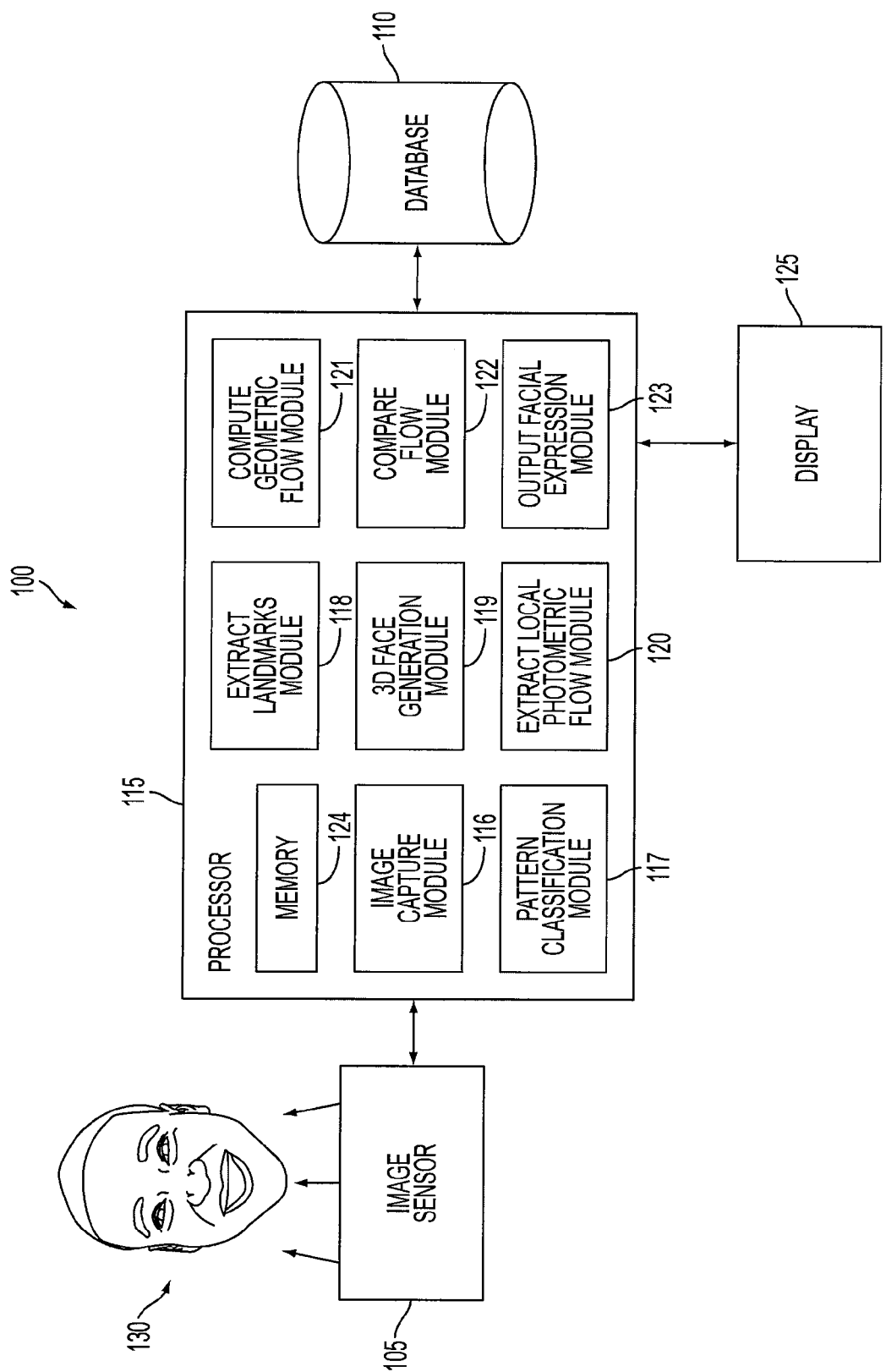
FIG. 1 is a schematic block diagram of a facial expression recognition system having an image sensor, a database, a processor, and a display device according to an embodiment of the invention.

FIG. 1 is a schematic block diagram of a facial expression recognition system 100 having an image sensor 105, a database 110, a processor 115, and a display device 125. The processor 115 may include special processing and storage modules such as an image capture module 116, a pattern classification module 117, an extract landmarks module 118, a 3D face generation module 119, an extract local photometric flow module 120, a compute geometric flow module 121, a compare flow module 122, an output facial expression module 123, and a memory module 124. These modules may include machine readable instructions stored on a machine readable medium, the machine readable instructions being executed by the processor 115 to cause the processor 115 to perform various functions as described in this disclosure.

The processor 115 may be implemented using hardware, software, firmware, middleware, microcode, or any combination thereof. The processor 115 may be an Advanced RISC Machine (ARM), a controller, a digital signal processor (DSP), a microprocessor, a machine readable medium, any other device capable of processing data, and combinations thereof. The term "machine readable medium" includes, but is not limited to, random access memory (RAM), flash memory, read-only memory (ROM), EPROM, EEPROM, registers, hard disk, removable disk, CD-ROM, DVD, wireless channels, and various other mediums capable of storing, containing or carrying instruction(s) and/or data. The database 110 may include data of facial deformation for known facial expressions.

The facial expression recognition system 100 detects facial expressions with illumination artifacts in changing or sever driving conditions (e.g., varying illuminations, noisy conditions, etc.), and determines or predicts drowsy facial expressions under these conditions. The facial expression recognition system 100 improves the expression recognition capabilities by using a prior knowledge of facial muscle movements in expressions and produces good results when faces are subjected to varying illuminations.

Figure 2:
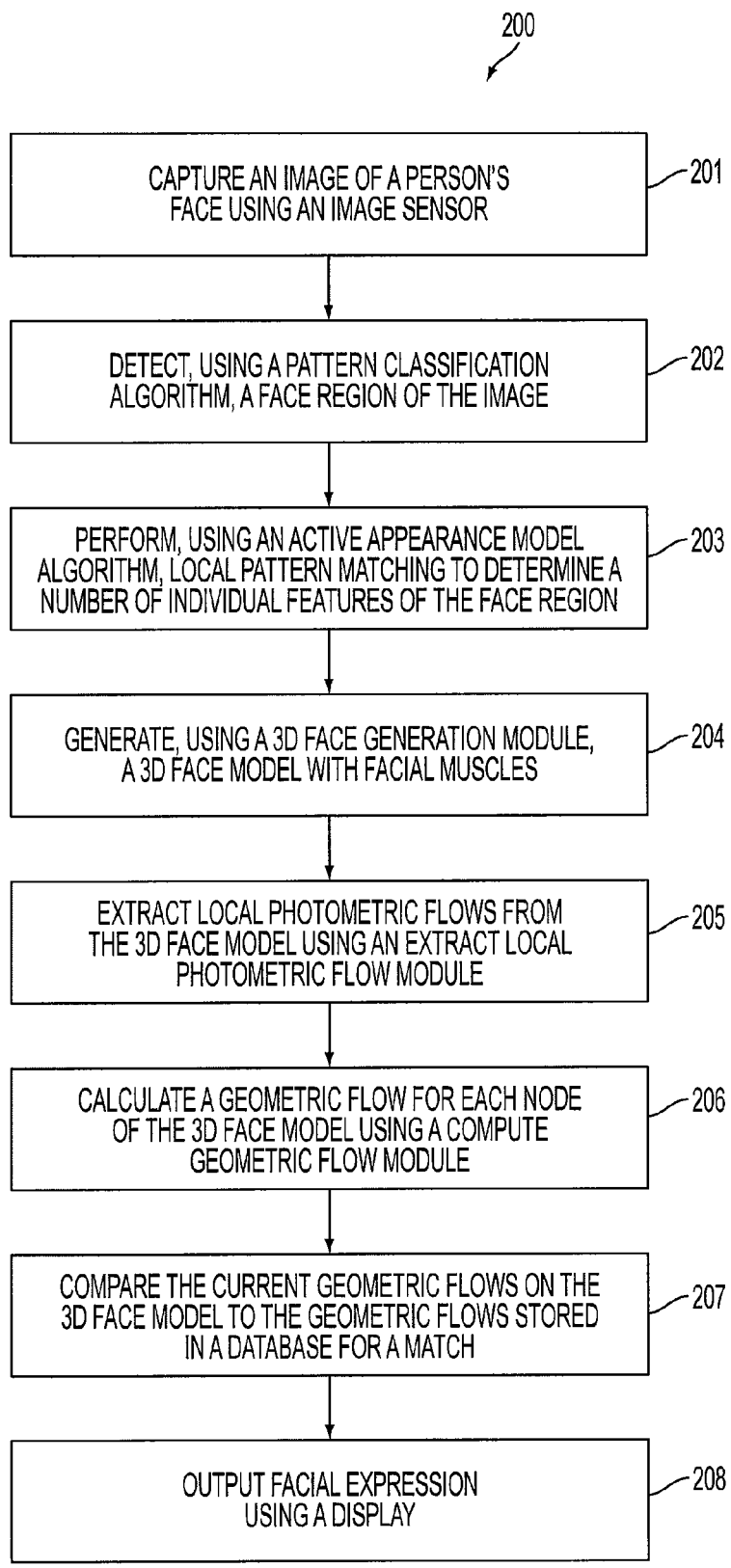
FIG. 2 is a flow chart of a method of detecting drowsy facial expressions of vehicle drivers under changing illumination conditions according to an embodiment of the invention.

FIG. 2 is a flow chart of a method 200 of detecting drowsy facial expressions of vehicle drivers under changing illumination conditions according to an embodiment of the invention. The method 200 is not limited to detecting drowsy facial expressions. The method 200 can also detect other facial expressions under illumination changing environments by including them in the set of dictionary values stored in the database 110. For example, other facial expressions leading to hazardous driving situations, such as angry, panic expressions can also be detected by this method and provide the driver with alertness of the hazards, if the facial expressions are included in the set of dictionary values.

Referring to FIGS. 1 and 2, the image sensor 105 is used to capture an image of a driver's or person's face 130 (block 201). The image of the person's face may be stored in the memory 124 and/or the database 110. The image sensor 105 is positioned within an interior of a vehicle in order to obtain a good image of the driver's face. For example, the image sensor 105 may be positioned next to or within an interior visor, a dash board, a steering wheel or a navigation screen of the vehicle.

The image sensor 105 is a device that converts an optical image to an electric signal for processing by the processor 115. The image sensor 105 is typically a charge-coupled device (CCD) or a complementary metal oxide semiconductor (CMOS) active-pixel sensor. Both types of sensor accomplish the same task of capturing an image and converting it into electrical signals. The sensors may respond to visible light, infrared (IR) radiation, and thermal energy to produce color, IR or thermal images.

In one embodiment, the image sensor 105 includes a plurality of photo sensors and hardware circuitry next to each photo sensor to convert the light energy to a voltage. The hardware circuitry may include an analog-to-digital (A/D) converter to convert the analog voltage to digital data. The digital data may be sent from the image sensor 105 to the image capture module 116.

The pattern classification module 117 retrieves the digital data of the person's face from the image capture module 116 and detects or locates, using a pattern classification algorithm or hardware, a face region of the captured image (block 202). The pattern classification algorithm or hardware may utilize principle component analysis to detect or locate the face region of the captured image. Further details regarding principle component analysis can be found in an article written by K. Kim, entitled "Face Recognition using Principle Component Analysis," which is incorporated by reference herein.

Once the face region is detected by the pattern classification module 117, the extract landmarks module 118 performs local pattern matching to determine, identify or locate a number of individual features or landmark points on the eye, mouth, nose tip, and ear-joint areas of the face region (block 203). The extract landmarks module 118 may include an active appearance model algorithm that is used to perform local pattern matching (i.e., match each of these individual features or landmark points of the face region retrieved from the captured image with a set of dictionary or stored facial values from the database 110). The set of dictionary or stored facial values may be the landmark markings or points from pre-annotated sets of images that were used as learning sets. These pre-annotated sets of images may be stored in the database 110. The set of dictionary or stored facial values essentially contain spatial derivatives between these landmark points, for example, an average distance and spatial derivative between eye corners, mouth corners, etc. Further details regarding the active appearance model algorithm can be found in an article written by Edwards, Taylor and Cootes entitled "Interpreting Face Images using Active Appearance Models," which is incorporated by reference herein.

Figure 3:
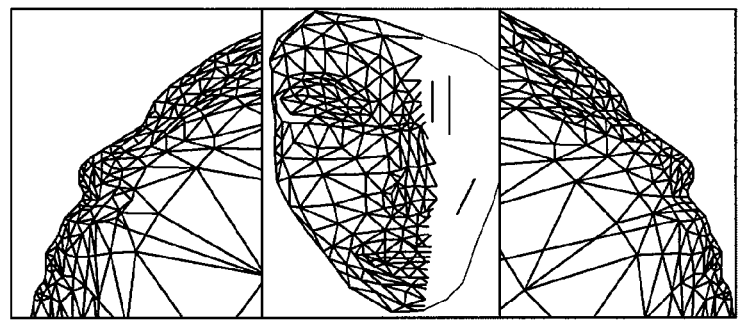
FIG. 3 is a graphical representation of a 3D face model with facial muscles of the face region of the driver according to an embodiment of the invention.

FIG. 3 is a graphical representation of a 3D face model with facial muscles of the face region of the driver according to an embodiment of the invention. The 3D face generation module 119 generates a 3D face model with facial muscles of the face region by obtaining a generic face model with pre-assigned facial muscles from the database 110 and adapting the generic face model to a 3D face model of the driver's face in the captured image by using a minimization algorithm such as a least squared minimization algorithm (block 204). The 3D face model includes a number of patches where each patch may be formed in the shape of a triangle or an object having at least 3 sides. Each patch may correspond to a facial muscle.

The extract local photometric flow module 120 extracts local photometric flows from the 3D face model (block 205). For each patch in the 3D face mesh, corresponding photometric flows or variations are computed on the local textures using the extract local photometric flow module 120. The photometric flows or variations define the motion flow between different facial features or parts. The local textures are created or obtained using the extract local photometric flow module 120 by superimposing the X-Y plane projection of the 3D face model. The photometric flows or variations may be computed differently under uniform illumination and changing illumination.

Figure 4:
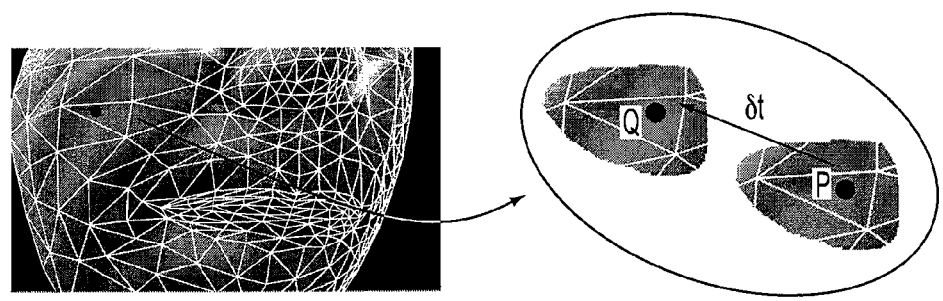
FIG. 4 is a graphical representation of image intensity under uniform illumination at different facial parts (i.e., point P and point Q) for determining photometric flow according to an embodiment of the invention.

FIG. 4 is a graphical representation of image intensity under uniform illumination at different facial parts (i.e., point P and point Q) for determining photometric flow according to an embodiment of the invention. For example, the image intensity of point P(x, y) at time t is I(x, y, t) and changes to Q(x, y) in a given time δt. The photometric flow of the motion is computed as $$\frac{\partial I}{\partial x}u + \frac{\partial I}{\partial y}v + \frac{\partial I}{\partial t} = 0, \text{ where } u = \frac{dx}{dt} \text{ and } v = \frac{dy}{dt}.$$

The extract local photometric flow module 120 stores the photometric flows for different facial parts (e.g., left and right eyes, eyebrows, forehead, mouth region, and cheek areas) for different facial expressions in the memory 124 and/or the database 110. The extract local photometric flow module 120 integrates these photometric flows with the pre-assigned facial muscles to generate a relationship between facial muscle movement in expressions and corresponding photometric flows.

There are three major types of facial muscles that are used in expressions: (1) linear muscles, (2) sheet muscles and (3) sphincter muscles. The Facial Action Coding System (FACS), developed by Ekman and Friesen in 1978, categorizes facial muscles into Action Units (AU), which comprise of one or more facial muscles and act in combination to produce different facial expressions. For example, a surprise expression includes AU4 (eyebrow frown), AU5 (raise upper eyelid), and AU6,7 (raise lower eyelid). Thus the facial area of influence by each action unit is defined and mathematically represented as a radial displacement function $\phi=f(d, r, k)$, where d=displacement of two given facial points in the influenced area, $r=\cos(\theta)$; $\theta$—displacement angle, and k=constant representing the elasticity of the skin. Therefore, by computing photometric flows ($\bar{I}$) in different facial regions for known expressions, a relationship between photometric flow and corresponding facial muscles or AU's displacement is derived based on the region of AU's influence, given by $\bar{I}=f(\Sigma\phi_{AU_n})$. For example, in a surprise expression $\bar{I}_{sup\ p}=f(\phi_{AU_4}+\phi_{AU_5}+\phi_{AU_{6,7}})$. These relationships are saved in the database 110 as facial deformations for known facial expressions. The radial displacement functions for each AU ($\phi_{AU_n}$) that has been stored in the database 110 together with its photometric flow is used to estimate the muscle activity from geometric flow.

Figure 5:
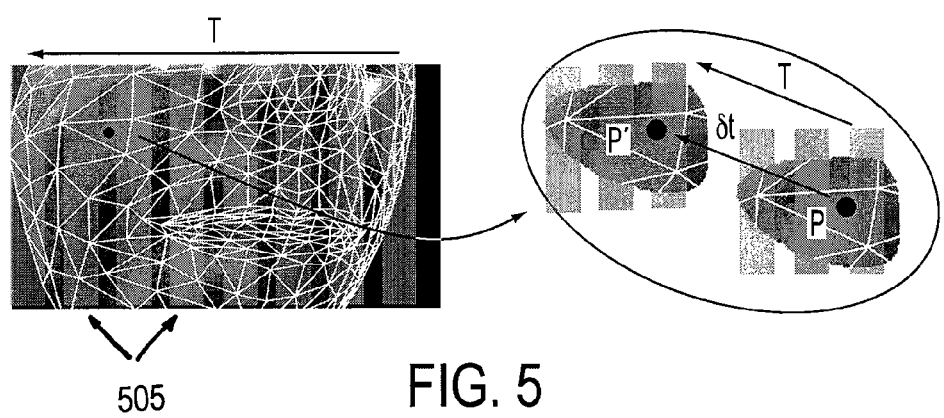
FIG. 5 is a graphical representation of image intensity under changing illumination at different facial parts (i.e., point P and point P') for determining photometric flow according to an embodiment of the invention.

FIG. 5 is a graphical representation of image intensity under changing illumination at different facial parts (i.e., point P and point P') for determining photometric flow according to an embodiment of the invention. A moving pattern 505 adds noise to the photometric flow. For example, the image intensity of point P(x, y) that is affected by the moving pattern at time t is I'(x, y, t) and changes to P'(x, y) in a given time δt. The photometric flow of the motion is computed as $$\frac{\partial I'}{\partial x}u + \frac{\partial I'}{\partial y}v + \frac{\partial I'}{\partial t} = 0, \text{ where } u = \frac{dx}{dt} \text{ and } v = \frac{dy}{dt}.$$

The extract local photometric flow module 120 stores the photometric flows for different facial parts (e.g., left and right eyes, eyebrows, forehead, mouth region, and cheek areas) for different facial expressions in the memory 124 and/or the database 110. The extract local photometric flow module 120 integrates these photometric flows with the pre-assigned facial muscles to generate a relationship between facial muscle movement in expressions and corresponding photometric flows. These relationships are saved in the database 110 as facial deformations for known facial expressions.

Figure 6:
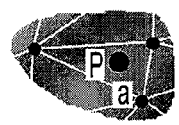
FIG. 6 is a graphical representation of a geometric flow of a current expression according to an embodiment of the invention.

FIG. 6 is a graphical representation of a geometric flow of a current expression according to an embodiment of the invention. The current expression may include a number of nodes at the corner of each patch of the 3D face model. The compute geometric flow module 121 calculates a 3D geometric flow or motion for each node of the 3D face mesh for the current expression (block 206). Prior to calculating the 3D geometric motion of each node, the compute geometric flow module 121 normalizes the face mesh to the reference origin and estimates displacement of the face mesh in X, Y, and Z directions.

As an example, let node a(x, y, z) in FIG. 6 represent a node on the face mesh in an expressionless face. The compute geometric flow module 121 can compute the geometric flow $\bar{G}$ of the node a(x, y, z) at a given time t during a facial expression as $$\bar{G} = \frac{dx}{dt} + \frac{dy}{dt} + \frac{dz}{dt}.$$

The geometric flows of different nodes on the face mesh for different facial expressions are stored in the database 110.

The data, stored in the database 110, may include facial muscle parameters with their respective geometric and photometric flows in consistent illuminations for different drowsy expressions, is used to determine the noise generated by illumination variations. For example, data values $\bar{I}$ represent the photometric flows, data values $\bar{M}$ (where $\bar{M}=f(\phi)$) represent the facial muscle motions or parameters, and data values $\bar{G}$ represent the geometric flows of a facial deformation in consistent illuminations for a given drowsy expression. Under changing illuminations, the photometric flow relationship is generated as $\bar{I}'=\bar{I}+\Psi$, where $\Psi$ is a noise factor added to the photometric flow due to changing illuminations.

To determine the correct facial expression under changing illuminations, the geometric flow is computed based on the motion of nodes (block 206). The compare flow module 122 compares the current geometric flows on the 3D face model to the geometric flows stored in the database 110 for a match (block 207). If a match is obtained, corresponding anticipated photometric flows are retrieved from database values. The localized geometric flow $\bar{G}$ ($(\bar{G}=f(x,y,z,t))$) is used to estimate the facial deformation in different facial regions and matched with the deformations generated by radial displacement functions defined for the influence of AUs in that region. Thus $\phi=f(d,r,k)$ are estimated from $\bar{G}$. Once a match is found, corresponding action units are determined. The actual photometric flow without the influence of illumination noise is thus derived from $\bar{I}=f(\Sigma\phi_{AU_n})$. The output facial expression module 123 estimates and/or removes the noise component by subtracting the two photometric flows $\bar{I}'$ and $\bar{I}$ and identifies and outputs the correct facial deformation and corresponding facial expression (block 208). Once a drowsy expression is detected by the system 100, the driver is notified of the hazard, using the display 125, by an audible alarm, visual warning signs or tactile actuation means to restore the alertness of the driver based on the severity of the detected drowsy expression.

Those of ordinary skill would appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of detecting drowsy facial expressions of vehicle drivers under changing illumination conditions comprising:
    capturing an image of a person's face using an image sensor;
    detecting a face region of the image using a pattern classification algorithm;
    performing, using an active appearance model algorithm, local pattern matching to identify a plurality of landmark points on the face region of the image;
    generating a 3D face model with facial muscles of the face region;
    determining photometric flows from the 3D face model using an extract photometric flow module;
    determining geometric flows from the 3D face model using a compute geometric flow module;
    determining a noise component generated by varying illuminations by comparing the geometric flows to the photometric flows; and
    removing the noise component by subtracting two photometric flows.

2. The method of claim 1 wherein the image sensor is a charge-coupled device (CCD) or a complimentary metal oxide semiconductor (CMOS) active-pixel sensor.

3. The method of claim 1 wherein the plurality of landmark points is selected from a group consisting of an eye portion, a mouth portion, a nose tip portion, an ear-joint portion, and combinations thereof.

4. The method of claim 1 wherein the local pattern matching matches each of the plurality of landmark points with a set of stored facial values in a database.

5. The method of claim 1 wherein the generating a 3D face model with facial muscles of the face region includes:
    obtaining a generic face model with pre-assigned facial muscles from a database; and
    adapting the generic face model to the 3D face model with the facial muscles of the face region using a minimization algorithm.

6. The method of claim 4 wherein the set of stored facial values include a plurality of landmark markings from pre-annotated sets of images that were used as learning sets.

7. The method of claim 4 wherein the set of stored facial values include a spatial derivative between the plurality of landmark points.

8. The method of claim 4 wherein the set of stored facial values include a spatial derivative between the plurality of landmark points.

9. The method of claim 1 wherein the determined photometric flows define a motion flow between the facial muscles.

10. The method of claim 1 further comprising integrating the determined photometric flows with the facial muscles to generate a relationship between facial muscle movement in expressions and corresponding photometric flows.

11. The method of claim 1 further comprising outputting on a display a facial deformation and a corresponding facial expression.

12. A method of detecting facial expressions of a person under changing illumination conditions comprising:
    capturing an image of at least a portion of the person's face using an image sensor;
    generating a model based on the image of at least the portion of the person's face;
    determining photometric flows based on the model using an extract photometric flow module;
    determining geometric flows based on the model using a compute geometric flow module;
    determining a noise component generated by varying illuminations by comparing the geometric flows to the photometric flows;
    removing the noise component by subtracting two photometric flows; and
    determining whether a deformation of the image of at least the portion of the person's face exists based at least in part on the removal of the noise component.

13. The method of claim 12 further comprising outputting an audible alarm or a visual alarm if the deformation of the image of at least the portion of the person's face exists.

14. The method of claim 12 wherein the step of generating a model includes generating a 3D face model with a facial muscle and further comprising the step of integrating the determined photometric flows with the facial muscle to generate a relationship between facial muscle movement in expressions and a corresponding photometric flow.

15. The method of claim 12 wherein the image sensor is a charge-coupled device (CCD) or a complimentary metal oxide semiconductor (CMOS) active-pixel sensor.

16. The method of claim 12 further comprising a step of performing, using an active appearance model algorithm, local pattern matching to identify a plurality of landmark points on the image of at least the portion of the person's face.

17. The method of claim 16 wherein the plurality of landmark points is selected from a group consisting of an eye portion, a mouth portion, a nose tip portion, an ear joint portion, and combinations thereof.

18. The method of claim 16 wherein the local pattern matching matches each of the plurality of landmark points with a set of stored facial values in a database.

19. The method of claim 18 wherein the set of stored facial values include a plurality of landmark markings from pre-annotated sets of images that were used as learning sets.

20. The method of claim 12 wherein the generating a model based on the image of at least the portion of the person's face includes:
    obtaining a generic face model with pre-assigned facial muscles from a database; and
    adapting the generic face model to the model to be generated with facial muscles of at least the portion of the person's face using a minimization algorithm.

* * * * *